(12) United States Patent
Manchanda et al.

(10) Patent No.: US 10,299,185 B1
(45) Date of Patent: May 21, 2019

(54) WIRELESS RELAY QUALITY-OF-SERVICE BASED ON RELAY-DELIVERED MEDIA SERVICES

(71) Applicant: Sprint Communications Company L.P., Overland Park, KS (US)

(72) Inventors: Nitesh Manchanda, Overland Park, KS (US); Vanil Parihar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/495,755

(22) Filed: Apr. 24, 2017

(51) Int. Cl.
H04W 40/12 (2009.01)
H04W 84/04 (2009.01)

(52) U.S. Cl.
CPC .......... H04W 40/12 (2013.01); H04W 84/047 (2013.01)

(58) Field of Classification Search
None
See application file for complete search history.

(56) References Cited

U.S. PATENT DOCUMENTS

| | | | |
|---|---|---|---|
| 7,133,417 B1 * | 11/2006 | Kao | H04L 12/5692 370/467 |
| 8,374,117 B2 | 2/2013 | Yi et al. | |
| 8,401,068 B2 | 3/2013 | Ulupinar et al. | |
| 8,483,123 B2 | 7/2013 | Zheng et al. | |
| 8,634,343 B2 | 1/2014 | Hart et al. | |
| 8,638,675 B2 | 1/2014 | Wang et al. | |
| 8,948,006 B2 | 2/2015 | Taneja | |
| 8,976,662 B2 | 3/2015 | Somasundaram et al. | |
| 9,019,848 B2 | 4/2015 | Chun et al. | |
| 9,160,566 B2 | 10/2015 | Ulupinar et al. | |
| 9,853,902 B2 * | 12/2017 | Chu | H04W 92/20 |
| 9,913,165 B1 * | 3/2018 | Fang | H04W 28/0268 |
| 9,967,817 B2 * | 5/2018 | Yang | H04W 36/0088 |
| 9,973,256 B2 * | 5/2018 | Fang | H04B 7/15507 |
| 9,986,487 B1 * | 5/2018 | Oroskar | H04W 40/22 |
| 2004/0106434 A1 | 6/2004 | Shibasaki | |
| 2010/0103863 A1 * | 4/2010 | Ulupinar | H04L 29/12207 370/315 |
| 2012/0093070 A1 * | 4/2012 | Huang | H04B 7/2606 370/315 |
| 2012/0093095 A1 * | 4/2012 | Barbieri | H04W 72/0426 370/329 |
| 2012/0120831 A1 | 5/2012 | Gonsa et al. | |
| 2013/0137423 A1 * | 5/2013 | Das | H04W 12/08 455/426.1 |

(Continued)

Primary Examiner — Farah Faroul

(57) ABSTRACT

A wireless data network controls Quality-of-Service (QoS) delivered to wireless relays. The wireless relays attach to wireless base stations in the wireless data network and transfer configuration data indicating their media services to the wireless data network. A relay QoS control system in the wireless data network receives the configuration data and allocates individual QoS levels to the wireless relays based on their media services. The relay QoS control system transfers the individual relay QoS levels for the wireless relays to the wireless base stations. The wireless relays exchange user data with wireless user devices to deliver the media services. The wireless base stations exchange the user data with the wireless relays to deliver the media services based on the individual QoS levels for the wireless relays.

18 Claims, 6 Drawing Sheets

(56) References Cited

U.S. PATENT DOCUMENTS

| | | | |
|---|---|---|---|
| 2013/0244672 A1* | 9/2013 | Lin | H04W 76/02 455/450 |
| 2014/0016539 A1* | 1/2014 | Rohit | H04W 72/04 370/315 |
| 2014/0106709 A1* | 4/2014 | Palamara | H04W 8/18 455/411 |
| 2016/0381720 A1* | 12/2016 | Baek | H04W 8/14 370/329 |
| 2017/0180085 A1* | 6/2017 | Balasubramanian | H04L 1/1812 |
| 2017/0265119 A1* | 9/2017 | Fang | H04B 7/15528 |
| 2018/0092022 A1* | 3/2018 | Huang | H04W 76/38 |

\* cited by examiner

WIRELESS RELAY QUALITY-OF-SERVICE BASED ON RELAY-DELIVERED MEDIA SERVICES

TECHNICAL BACKGROUND

Data communication networks serve User Equipment (UE) with data communication services like internet access, voice calling, social networking, and the like. To extend the range and mobility of these data communication services, the data communication networks deploy wireless access networks. The wireless access networks have wireless base stations that communicate wirelessly with the UEs. The wireless base stations are also coupled to the data communication networks. Wireless relays are used to further extend the range of the wireless base stations. Thus, wireless relays exchange user data between the UEs and the wireless base stations.

A wireless relay has a wireless access point to serve wireless UEs. The wireless relay also has relay equipment that provides wireless connectivity to a wireless data network. Thus, the user data traverses the wireless user device, wireless access point, and relay equipment to reach the wireless network base station in the data network. In some cases, a wireless relay has multiple wireless access points. For example, the wireless relay may have a voice-calling access point and an internet data access point.

Unfortunately, the large-scale deployment of wireless relays may over-burden the available wireless base stations. The Quality-of-Service (QoS) that is delivered to the wireless relays suffers as a result. The delivery of QoS to the wireless relays is further complicated by the various types of wireless relays. Current techniques to control the QoS for a diverse group of wireless relays is not yet efficient and effective. In particular, QoS control is lacking for different types of wireless relays that deliver various mixes of voice and data services.

TECHNICAL OVERVIEW

A wireless data network controls Quality-of-Service (QoS) delivered to wireless relays. The wireless relays attach to wireless base stations in the wireless data network and transfer configuration data indicating their media services to the wireless data network. A relay QoS control system in the wireless data network receives the configuration data and allocates individual QoS levels to the wireless relays based on their media services. The relay QoS control system transfers the individual relay QoS levels for the wireless relays to the wireless base stations. The wireless relays exchange user data with wireless user devices to deliver the media services. The wireless base stations exchange the user data with the wireless relays to deliver the media services based on the individual QoS levels for the wireless relays.

DETAILED DESCRIPTION

Figure 1:
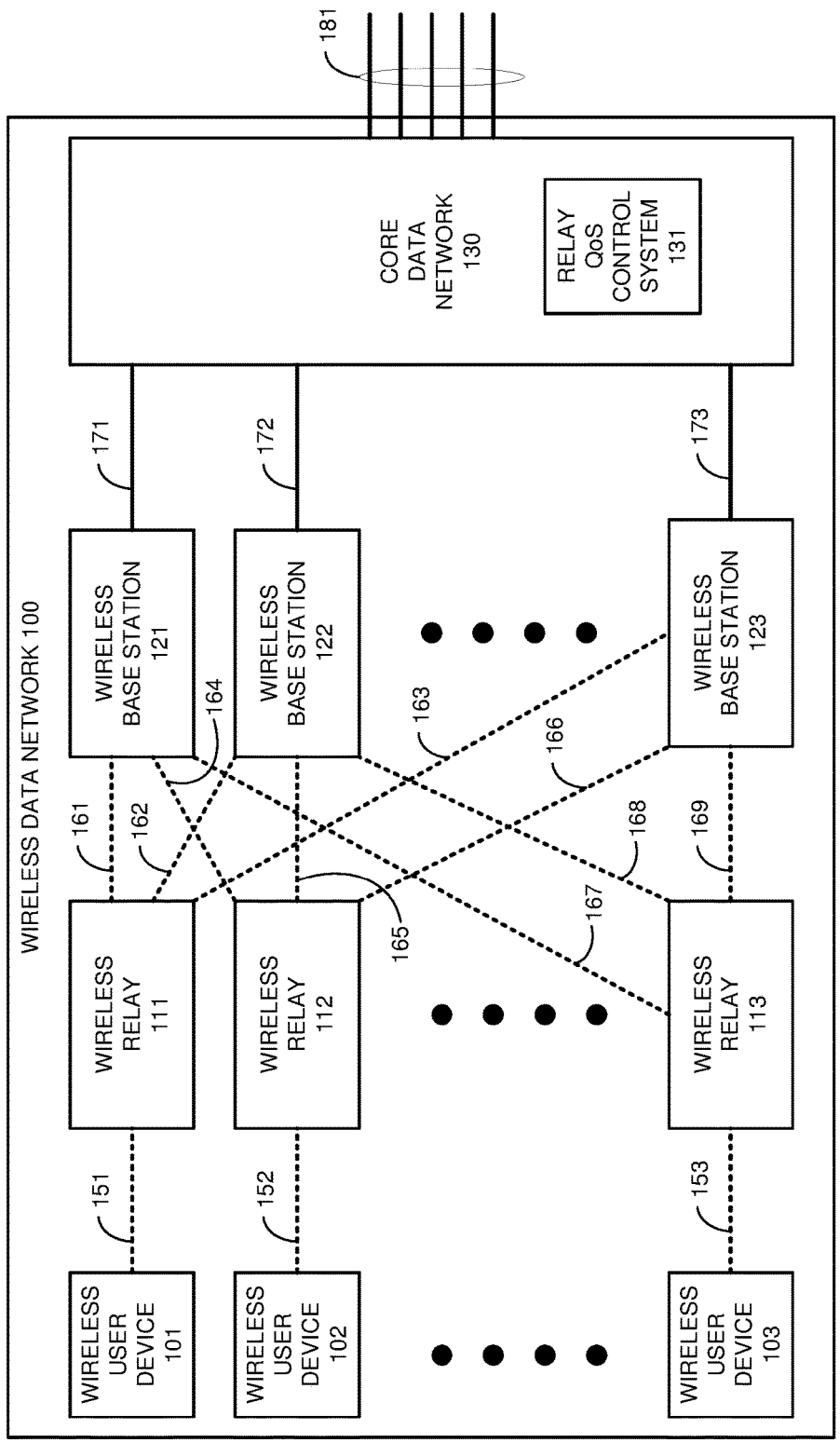
FIG. 1 illustrates a wireless data network to control Quality-of-Service (QoS) delivered to wireless relays.

FIG. 1 illustrates wireless data network 100 to control Quality-of-Service (QoS) delivered to wireless relays. Wireless data network 100 comprises wireless user devices 101-103, wireless relays 111-113, wireless base stations 121-123 and core data network 130. Core data network 130 includes relay QoS control system 131. Wireless data network 100 typically includes several more user devices, wireless relays, and base stations, but the amount shown has been restricted for clarity.

Wireless user devices 101-103 comprise computers, phones, or some other intelligent data machines with wireless communication transceivers. Wireless user devices 101-103 use Institute of Electrical and Electronic Engineers (IEEE) 802.11, Long-Term Evolution (LTE), Code Division Multiple Access (CDMA), or some other wireless protocol. Wireless data network 100 delivers various data communication services to wireless user devices 101-103 like internet access, enterprise networking, media conferencing, social networking, machine-to-machine communications, and the like.

Wireless relays 111-113 each comprise one or more wireless access points. The wireless access points each comprise antennas, amplifiers, modulators, filters, signal processors, and a computer system. The computer system comprises Central Processing Units (CPUs), Random Access Memory (RAM), data storage, Input/Output (I/O) transceivers, and bus interfaces. The CPUs retrieve software from the memories and execute the software to direct the operation of the other computer system components. The software comprises modules for operating system, user access, network access, and network control. Exemplary wireless access points include LTE eNodeBs, IEEE 802.11 modems, and CDMA transceivers, although other devices could be used.

Wireless relays 111-113 each comprise relay equipment. The relay equipment comprises antennas, amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other components. The software comprises modules for operating system, access point interface, network access, and network control. The relay equipment may comprise User Equipment (UE) that has been adapted to serve the relay's wireless access points. Exemplary wireless protocols for the relay equipment include LTE, IEEE 802.11, and CDMA, although other protocols could be used.

Wireless base stations 121-123 each comprise antennas, amplifiers, modulators, filters, signal processors, and a computer system. The computer system comprises CPUs, RAM, data storage, I/O transceivers, and bus interfaces. The CPUs retrieve software from the memories and execute the software to direct the operation of the other computer system components. The software comprises modules for operating system, user/relay access, network access, and network control. Exemplary wireless base stations include LTE eNodeBs and CDMA base transceiver stations, although other devices be used.

Core data network 130 comprises gateways, routers, databases, controllers, and other network elements. These components reside in one or more computer systems with CPUs, RAM, data storage, I/O transceivers, and bus interfaces. The CPUs retrieve software from the memories and execute the software to direct the operation of the other computer system components. The software comprises modules for operating system, virtualization, network access, and network control—including relay QoS control. Exemplary core data networks comprise LTE cores and CDMA cores, although other architectures could be used. Relay QoS control system 131 comprises a computer system and software that may be integrated within the other network elements of core data network 130.

Wireless user devices 101-103 and wireless relays 111-113 wirelessly exchange user data and network signaling over wireless communication links 151-153. Wireless relays 111-113 and wireless base stations 121-123 wirelessly exchange user data and network signaling over wireless communication links 161-169. Wireless communication links 151-153 and 161-169 comprise IEEE 802.11 links, LTE links, CDMA links, or some other type of wireless data links. Wireless base stations 121-123 and core data network 130 exchange user data and network signaling over network data links 171-173. Core data network 130 and external systems (not shown) exchange user data over network data links 181. Network data links 171-173 and 181 comprise IEEE 802.3 links, Wave Division Multiplex (WDM) links, Internet Protocol (IP) links, wireless links, or some other type of communication links.

In operation, wireless relays 111-113 wirelessly attach to wireless base stations 121-123 in wireless data network 100. For example, wireless relays 111-113 may each perform a 360-degree scan for wireless pilot signals to identify and select base stations. Wireless relays 111-113 then exchange network signaling with selected base stations to obtain wireless data service. In some cases, a wireless relay may scan twelve 30-degree segments in a 360-degree scan and then attach to twelve different wireless base stations—one in each 30-degree segment.

Wireless relays 111-113 transfer configuration data indicating their media services to wireless base stations 121-123 for delivery to relay QoS control system 131. Wireless relays 111-113 may transfer the configuration data in network signaling during wireless attachment. The media services comprise voice conferencing and/or video conferencing. Exemplary voice conferencing media service include CDMA calling, Global System for Mobile Communications (GSM) calling, Voice over IP (VOIP) calling, and Voice over LTE (VoLTE) calling, although other voice communication platforms could be used.

In core data network 130, relay QoS control system 131 receives the configuration data. Relay QoS control system 131 allocates individual QoS levels to the wireless relays 111-113 based on their media services. Exemplary QoS levels include Carrier Aggregation (CA) carriers, Beam-Forming (BF) resources, QoS Class Indicators (QCIs), Ambient Bit Rates (AMBRs), although other QoS metrics could be used. The higher QoS levels are allocated to the wireless relays that deliver media services. Thus, a wireless relay that delivers a CDMA voice calling media service would receive a higher QoS than a wireless relay without any voice calling media service. A wireless relay that delivers a specific type of voice calling (like CDMA or GSM) may receive a higher QoS than a wireless relay that delivers a different type of voice calling (like VOIP or VoLTE).

In addition, relay QoS control system 131 could allocate individual QoS levels to the wireless relays 111-113 based on their video conferencing media services in a similar manner. Relay QoS control system 131 transfers the individual relay QoS levels for wireless relays 111-113 to wireless base stations 121-123. QoS control system 131 typically groups the individual relay QoS levels per base station, so a given base station only receives the QoS levels for its own set of attached wireless relays.

Wireless user devices 101-103 attach to wireless relays 111-113 to obtain wireless data services like internet access, enterprise networking, social networking, and media services like voice/video conferencing. Wireless relays 111-113 exchange user data and network signaling with wireless user devices 101-103 over wireless links 151-153 to deliver the wireless data services. Wireless relays 111-113 also exchange user data and network signaling with wireless base stations 121-123 over wireless links 161-169 to deliver the wireless data services. Wireless base stations 121-123 exchange user data and network signaling with core data network 130 over network links 171-173 to support the wireless data services. Core data network 130 exchanges user data with the external systems over network links 181 to support the wireless data services.

Wireless base stations 121-123 apply the individual QoS levels to wireless relays 111-113 per the instructions from relay QoS control system 131. Wireless base stations 121-123 apply the individual QoS levels to the data exchanges over wireless links 161-169 and perhaps network links 171-173. For example, the instructions from relay QoS control system 131 may direct wireless base station 122 to serve wireless relay 111 with 5 CA Secondary Component Carriers (SCCs) while serving wireless relays 112-113 with only 2 CA SCCs. In another example, the instructions from relay QoS control system 131 may cause wireless base station 122 to direct wireless relay 113 to reattach to a different wireless base station and drop wireless base station 122 altogether.

Figure 2:
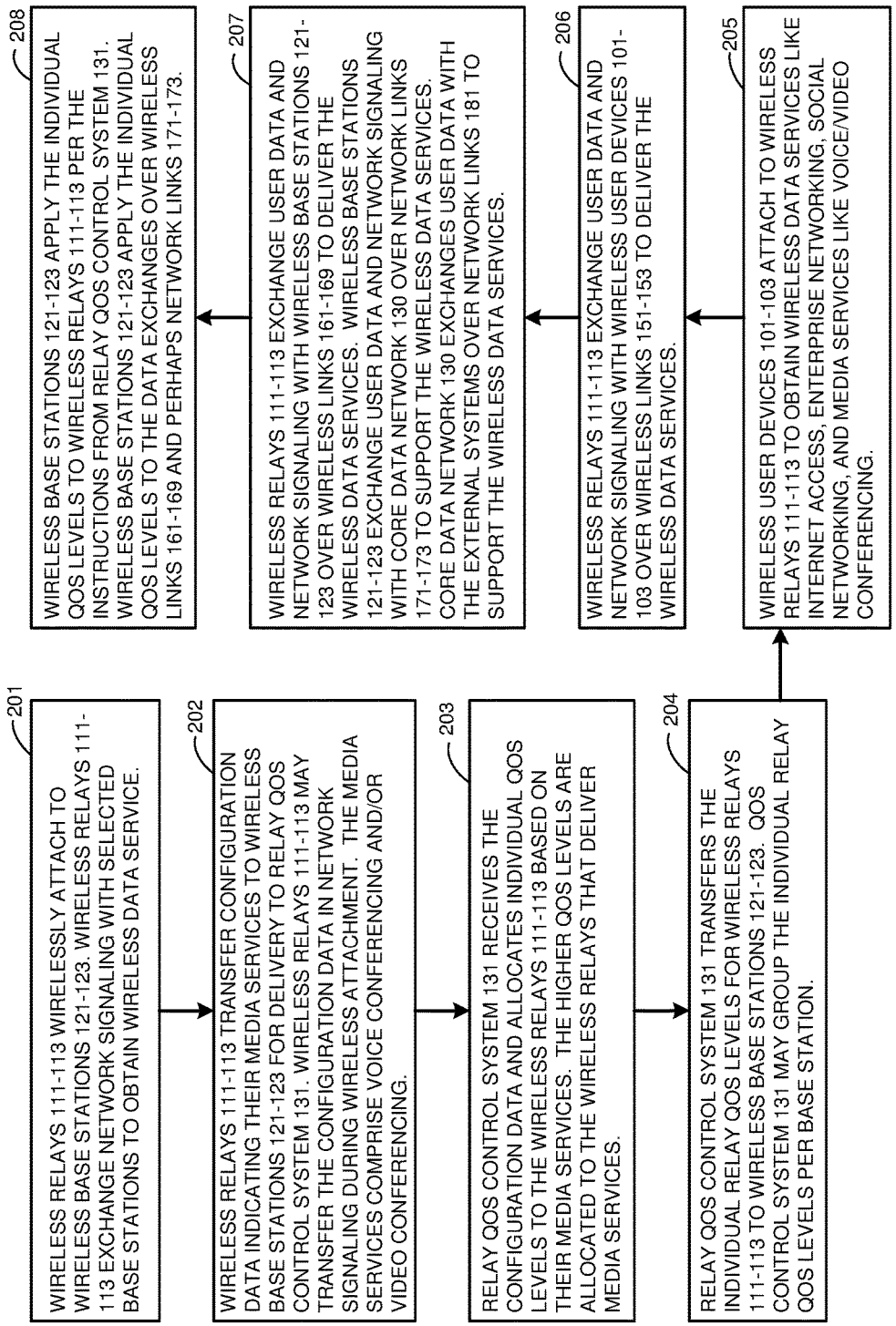
FIG. 2 illustrates the operation of the wireless data network to control the QoS delivered to wireless relays.

FIG. 2 illustrates the operation of wireless data network 100 to control the QoS delivered to wireless relays 111-113. Wireless relays 111-113 wirelessly attach to wireless base stations 121-123 (201). For example, wireless relays 111-113 may perform 360-degree pilot signal scans and select base stations by signal strength. Wireless relays 111-113 then exchange network signaling with the selected base stations to obtain their wireless data service.

Wireless relays 111-113 transfer configuration data indicating their media services to wireless base stations 121-123 for delivery to relay QoS control system 131 (202). Wireless relays 111-113 may transfer the configuration data in network signaling during wireless attachment. The media services comprise voice conferencing and/or video conferencing. Exemplary voice conferencing media services include voice calling based on CDMA, GSM, VOIP, and VoLTE.

Relay QoS control system 131 receives the configuration data (203). Relay QoS control system 131 allocates individual QoS levels to the wireless relays 111-113 based on their media services. Exemplary QoS levels include CA carriers, BF resources, QCIs, and AMBRs, although other QoS metrics could be used. The higher QoS levels are allocated to the wireless relays that deliver media services. Thus, a wireless relay that delivers a CDMA voice calling media service would receive a higher QoS than a wireless relay without a comparable voice calling media service. Relay QoS control system 131 transfers the individual relay QoS levels for wireless relays 111-113 to wireless base stations 121-123 (204). QoS control system 131 may group the individual relay QoS levels per base station, so a given base station only gets the QoS levels for its own attached wireless relays.

Wireless user devices 101-103 attach to wireless relays 111-113 to obtain wireless data services like internet access, enterprise networking, social networking, and media services like voice/video conferencing (205). Wireless relays 111-113 exchange user data and network signaling with wireless user devices 101-103 over wireless links 151-153 to deliver the wireless data services (206). Wireless relays 111-113 exchange user data and network signaling with wireless base stations 121-123 over wireless links 161-169 to deliver the wireless data services (207). Wireless base stations 121-123 exchange user data and network signaling with core data network 130 over network links 171-173 to support the wireless data services. Core data network 130 exchanges user data with the external systems over network links 181 to support the wireless data services.

Wireless base stations 121-123 apply the individual QoS levels to wireless relays 111-113 per the instructions from relay QoS control system 131 (208). Thus, each wireless relay has a customized QoS level that is delivered by wireless base stations 121-123. Wireless base stations 121-123 apply the individual QoS levels to the data exchanges over wireless links 161-169 and perhaps network links 171-173. For example, relay QoS control system 131 may direct wireless base station 122 to serve wireless relay 111 with more CA SCCs than wireless relays 112-113. In another example, relay QoS control system 131 may instruct wireless base station 122 to direct wireless relays 112-113 to reattach to different base stations to protect the QoS for wireless relay 111.

Figure 3:
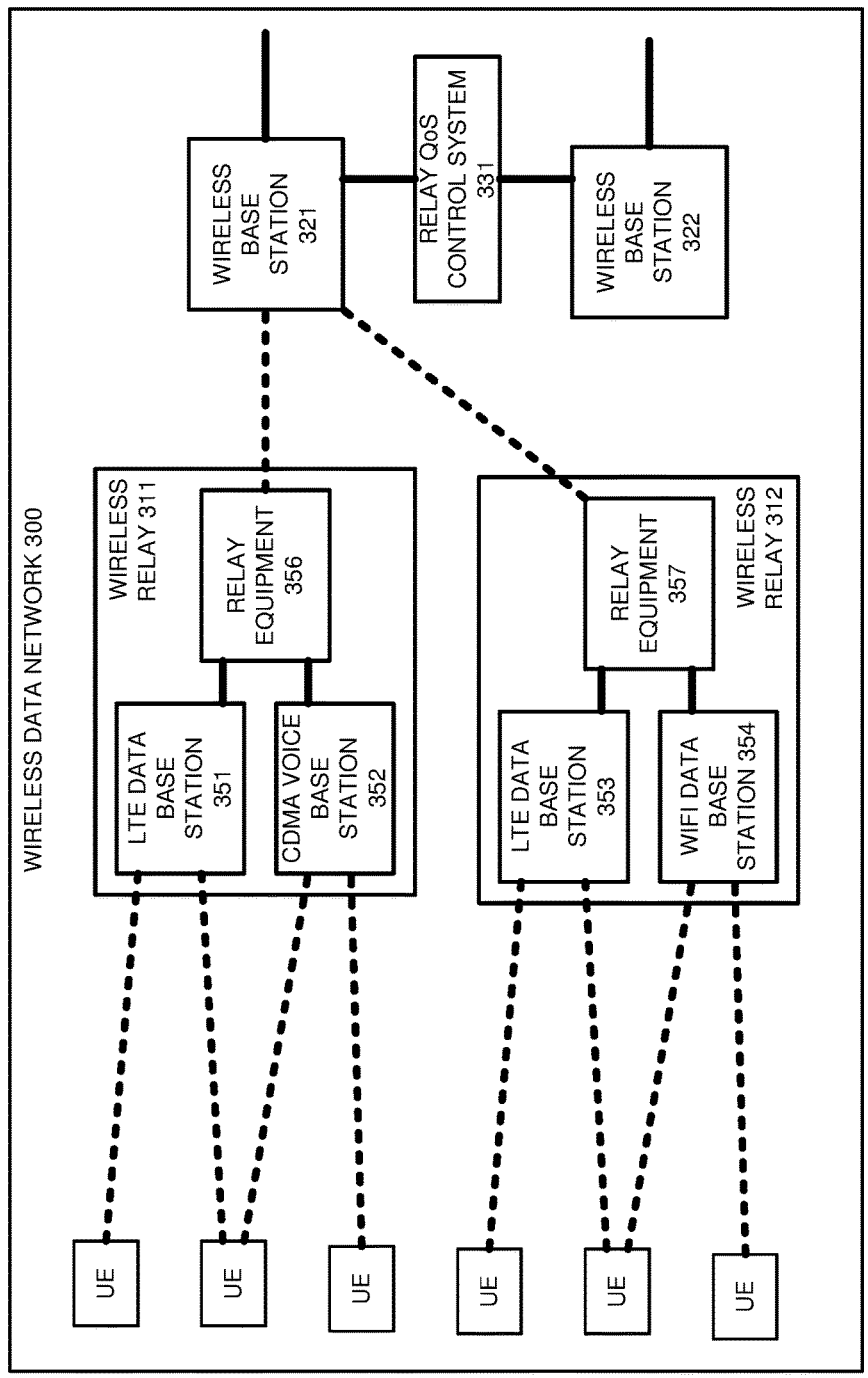
FIG. 3 illustrates a wireless data network to control QoS for wireless relays that deliver a Code Division Multiple Access (CDMA) voice service.

FIG. 3 illustrates wireless data network 300 to control QoS for wireless relay 311 that delivers CDMA voice service. Wireless data network 300 comprises wireless User Equipment (UE), wireless relays 311-312, wireless base stations 321-322, and relay QoS control system 331. Wireless relay 311 comprises LTE data base station 351, CDMA voice base station 352, and Relay Equipment (RE) 356. Wireless relay 312 comprises LTE data base station 353, IEEE 802.11 (WIFI) base station 354, and RE 357. REs 356-357 could be UEs adapted to serve base stations 351-354 in wireless relays 311-312. Relay QoS control system 350 comprises a computer system and software that may be distributed across wireless base stations 321-322.

REs 356-357 wirelessly attach to wireless base station 321. REs 356-357 determine their media service configurations. For example, RE 356 may identify its media services during boot-up by querying its served wireless access points. RE 356 serves CDMA voice base station 352, so it identifies its CDMA voice media service configuration. RE 357 does not serve any CDMA voice base stations, so it does not identify any CDMA voice media service configuration. REs 356-357 transfer configuration data indicating their media services to wireless base station 321 for delivery to relay QoS control system 331. REs 356-357 may transfer the configuration data in network signaling during wireless attachment.

Relay QoS control system 331 receives the configuration data. Relay QoS control system 331 allocates individual QoS levels to wireless relays 311-312 based on their media services. In this example, wireless relay 311 supports the CDMA voice service and wireless relay 312 does not support the CDMA voice service. Thus, relay QoS control system 331 allocates a higher QoS level to wireless relay 311 than to wireless relay 312, because wireless relay 311 supports the media service and wireless relay 312 does not support the media service. Relay QoS control system 331 transfers the individual relay QoS levels for REs 356-357 in wireless relays 311-312 to wireless base station 321.

The UEs attach to base stations 351-354 in wireless relays 311-312 to obtain wireless data services like internet access, enterprise networking, social networking, and media services like CDMA voice calling. The UEs and base stations 351-354 exchange user data and network signaling to deliver the wireless data services. Base stations 351-354 and REs 356-357 exchange user data and network signaling to deliver the wireless data services. REs 356-357 and wireless base station 321 exchanges user data and network signaling to deliver the wireless data services. Wireless base station 321 exchanges user data and network signaling with a core data network (not shown) to support the wireless data services.

Wireless base station 321 applies the individual QoS levels to REs 356-357 in wireless relays 311-312 per the instructions from relay QoS control system 331. In this example, relay QoS control system 331 directs wireless base station 321 to serve RE 356 with a higher QoS level that RE 357 because wireless relay 311 delivers a CDMA voice media service and wireless relay 312 does not deliver the CDMA voice media service. In some cases, relay QoS control system 331 may direct wireless base station 321 to serve RE 356 with more CA SCCs than RE 357. Relay QoS control system 331 may also instruct wireless base station 321 to direct RE 357 to reattach wireless relay 312 to wireless base station 322.

Figure 4:
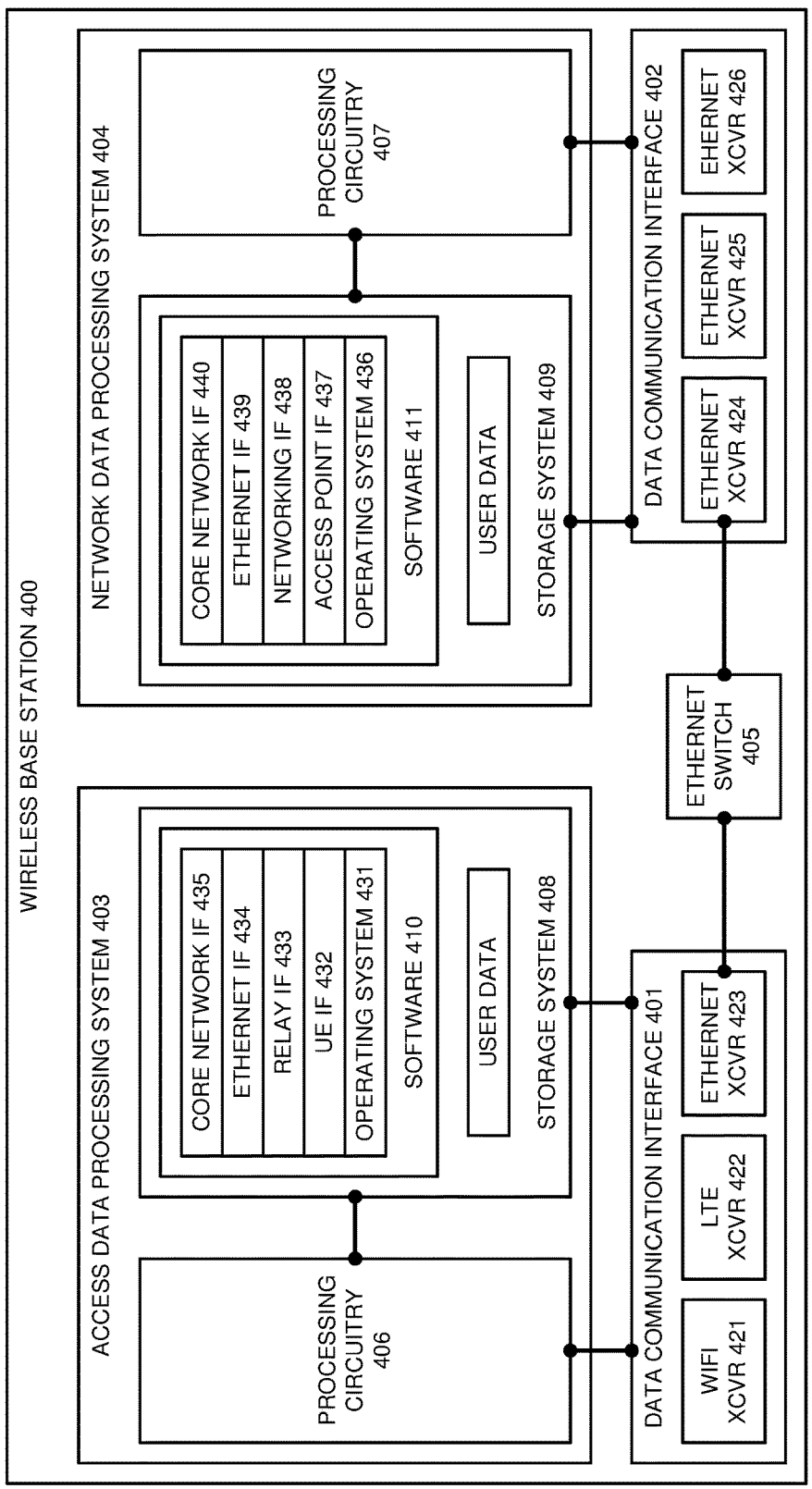
FIG. 4 illustrates a wireless base station to control QoS delivered to wireless relays.

FIG. 4 illustrates wireless base station 400 to control QoS delivered to wireless relays. Wireless base station 400 comprises data communication interfaces 401-402, data processing systems 403-404, and IEEE 802.3 (Ethernet) switch 405. Data communication interface 401 comprises WIFI transceiver (XCVR) 421, LTE transceiver 422, and Ethernet transceiver 423. Data communication interface 402 comprises Ethernet transceivers 424-426. Transceivers 421-426 comprise communication components, such as signal processors, ports, bus interfaces, memory, software, and the like. Access data processing system 403 and network data processing system 404 communicate over Ethernet transceivers 423-424 and Ethernet switch 405.

Access data processing system 403 comprises processing circuitry 406 and storage system 408. Storage system 408 stores software 410 and user data. Software 410 includes respective software modules 431-435. Storage system 408 comprises non-transitory, machine-readable, data storage media, such as flash drives, memory circuitry, and the like. Software 410 comprises machine-readable instructions that control the operation of processing circuitry 406 when executed. Processing circuitry 406 comprises CPUs and RAM. Network data processing system 404 comprises processing circuitry 407 and storage system 409. Storage system 409 stores software 411 and user data. Software 411 includes respective software modules 436-440. Processing circuitry 407 comprises CPUs and RAM. Storage system 409 comprises non-transitory, machine-readable, data storage media, such as flash drives, memory circuitry, and the like. Software 411 comprises machine-readable instructions that control the operation of processing circuitry 407 when executed.

When executed by processing circuitry 406, software modules 431-435 direct circuitry 406 to perform the following operations. Operating system 431 interfaces between software modules 432-435 and system software/hardware. UE interface (IF) 432 directs user device access operations. Relay interface 433 controls relay QoS based on their media services and interacts with access point interface 437 over ethernet interface 434 and 439. Core network interface 435 interacts with core network systems over signaling links like S1-MME and X2.

When executed by processing circuitry 407, software modules 436-440 direct circuitry 407 to perform the following operations. Operating system 436 interfaces between software modules 437-440 and system software/hardware. Access point interface 437 interacts with relay interface 434 over Ethernet interfaces 439 and 434. Networking interface 438 interacts with wireless base stations like macrocell LTE eNodeBs. Core network interface 440 interacts with core network systems over signaling links like Non-Access Stratum (NAS).

Figure 5:
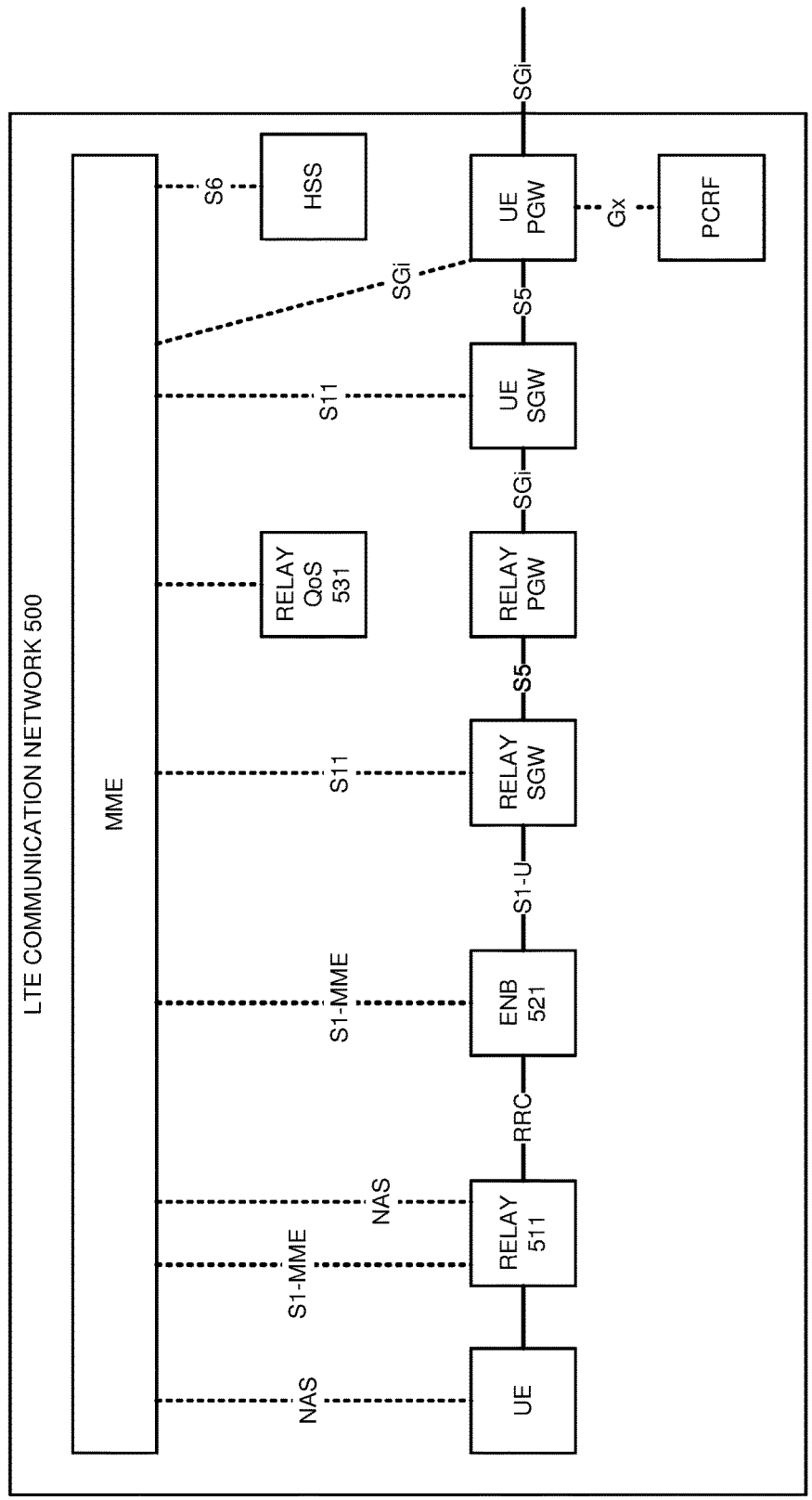
FIG. 5 illustrates a Long-Term Evolution (LTE) network to control QoS delivered to wireless relays.

FIG. 5 illustrates Long-Term Evolution (LTE) network 500 to control QoS delivered to wireless relay 511. LTE communication network 500 comprises: a UE, wireless relay 511, eNode-B (ENB) 521, relay Serving Gateway (SGW), relay Packet Data Network Gateway (PGW), UE SGW, UE PGW, Policy Charging and Rules Function (PCRF), Mobility Management Entity (MME), Home Subscriber System (HSS), and Relay QoS server 531. The UE and wireless relay 511 communicate over IEEE 802.11 or LTE links. Wireless relay 511 and ENB 521 communicate over LTE Radio Resource Control (RRC) links. ENB 521 and the relay SGW communicate over S1-U links.

The relay SGW and relay PGW communicate over S5 links. The relay PGW and UE SGW communicate over SGi links. The UE SGW and UE PGW communicate over S5 links. The UE PGW communicates with the PCRF over Gx links. The UE PGW communicates with other systems including the MME over SGi links. The MME has the following signaling links: Non-Access Stratum (NAS) to the UE, S1-MME to wireless relay 511 for its internal base stations, NAS to wireless relay 511 for its RE, S1-MME to the ENB 521, S11 to the relay SGW and the UE SGW, and S6 to the HSS. Note that the UE NAS, relay S1-MME, and relay NAS traverse the S1-Us, S5s, and SGi data links to reach the MME.

In operation, wireless relay 511 wirelessly attaches to ENB 521. Wireless relay 511 then exchanges network signaling (S1-MME and NAS) with ENB 521 and the MME to obtain wireless data service. Wireless relay 511 transfers configuration data indicating its media services to ENB 521 for delivery to relay QoS control server 531. The configuration data may traverse the NAS link from relay 511 to the MME during wireless attachment. The media services comprise voice conferencing like CDMA, GSM, VOIP, and VoLTE, although other voice communication platforms could be used.

Relay QoS control system 531 allocates a QoS level to wireless relay 511 based on its media services. Exemplary QoS levels include CA carriers, BF resources, QCIs, and AMBRs, although other QoS metrics could be used. Wireless relay 521 gets a higher QoS level if it serves media services and perhaps only if it serves specific media service types like CDMA voice calling. Relay QoS control server 531 transfers the individual relay QoS level for wireless relay 511 to ENB 521.

The UE attaches to wireless relay 511 to obtain wireless data services like internet access, enterprise networking, social networking, and media services like voice/video conferencing. Wireless relay 511 exchanges user data and network signaling with the UE to deliver the wireless data services. Wireless relay 511 exchanges user data and network signaling with ENB 521 to deliver the wireless data services. ENB 521 exchanges user data and network signaling with the relay SGW to deliver the wireless data services.

The relay SGW exchanges user data and signaling for the data services with the relay P-GW. The relay PGW exchanges user data and signaling for the data services with the UE SGW. The UE SGW exchanges user data and signaling for the data services with the UE P-GW.

The UE PGW exchanges the signaling for the data services with the MME. The UE PGW exchanges user data for the data services with external systems (not shown). ENB 521 applies the individual QoS level to data exchanges with wireless relay 511 per the instructions from relay QoS control server 531. For example, relay QoS control server 531 may direct ENB 521 to serve wireless relay 511 with more CA SCCs than other wireless relays. Relay QoS control server 531 may instruct ENB 521 to direct wireless relay 511 to reattach to a different ENB.

Figure 6:
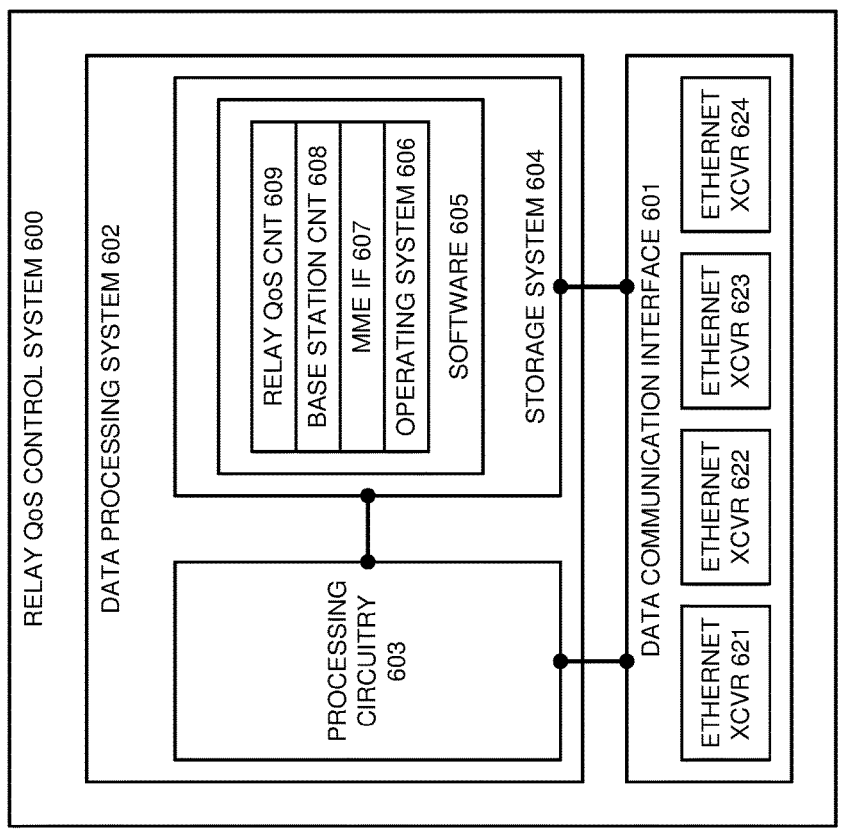
FIG. 6 illustrates a relay QoS control system to control QoS delivered to wireless relays.

FIG. 6 illustrates relay QoS control system 600 to control QoS delivered to wireless relays. Relay QoS control system 600 comprises data communication interface 601 and data processing system 602. Data communication interface 601 comprises transceivers 621-624 for Ethernet/IP communications. Transceivers 621-624 comprise communication components, such as signal processors, ports, bus interfaces, memory, software, and the like.

Data processing system 602 comprises processing circuitry 603 and storage system 604. Storage system 604 stores software 605. Software 605 includes respective software modules 606-609. Processing circuitry 603 comprises CPUs and RAM. Storage system 604 comprises non-transitory, machine-readable, data storage media, such as flash drives, memory circuitry, and the like. Software 605 comprises machine-readable instructions that control the operation of processing circuitry 603 when executed.

When executed by processing circuitry 603, software modules 606-609 direct circuitry 603 to perform the following operations. Operating system 606 interfaces between software modules 607-609 and system software/hardware. MME interface 607 communicates with MMEs to receive configuration data and transfer relay QoS levels. Base station controller (CNT) 608 interacts with wireless base stations over MME interface 607 to transfer relay QoS levels. Relay QoS controller 609 selects the relay QoS levels based on relay media services and perhaps other factors.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data network to control Quality-of-Service (QoS) delivered to wireless relays, the method comprising:
the wireless relays attaching to wireless base stations in the wireless data network and transferring configuration data indicating their media services to the wireless data network;
a relay QoS control system in the wireless data network receiving the configuration data, allocating individual QoS levels to the wireless relays based on their media services, and transferring the individual relay QoS levels for the wireless relays to the wireless base stations;

the wireless relays exchanging user data with wireless user devices to deliver the media services; and some of the wireless base stations directing some of the wireless relays to re-attach to other ones of the wireless base stations based on the individual QoS levels for the wireless relays.

2. The method of claim 1 wherein allocating the individual QoS levels to the wireless relays based on their media services comprises:

allocating higher ones of the individual QoS levels to ones of the wireless relays that deliver a voice media service; and allocating lower ones of the individual QoS levels to other ones of the wireless relays that do not deliver the voice media service.

3. The method of claim 1 wherein allocating the individual QoS levels to the wireless relays based on their media services comprises:

allocating higher ones of the individual QoS levels to ones of the wireless relays that deliver a specific type of voice media service; and allocating lower ones of the individual QoS levels to other ones of the wireless relays that do not deliver the specific type of voice media service.

4. The method of claim 1 wherein allocating the individual QoS levels to the wireless relays based on their media services comprises:

allocating higher ones of the individual QoS levels to ones of the wireless relays that deliver a Code Division Multiple Access (CDMA) media service; and allocating lower ones of the individual QoS levels to other ones of the wireless relays that do not deliver the CDMA media service.

5. The method of claim 1 wherein allocating the individual QoS levels to the wireless relays based on their media services comprises:

allocating higher ones of the individual QoS levels to ones of the wireless relays that deliver a video media service; and allocating lower ones of the individual QoS levels to other ones of the wireless relays that do not deliver the video media service.

6. The method of claim 1 wherein transferring the individual relay QoS levels for the wireless relays to the wireless base stations comprises determining a set of the wireless relays that are attached to one of the wireless base stations and transferring the individual relay QoS levels for the set of the wireless relays to the one of the wireless base stations.

7. The method of claim 1 wherein the wireless relays transferring the configuration data indicating their media services comprises:

wireless access points in the wireless relays determining their media services and indicating their media services to Relay Equipment (REs) in the wireless relays; and the REs transferring the configuration data indicating the media services delivered by their wireless access points to the wireless data network.

8. The method of claim 1 wherein:

the wireless relays attaching to the wireless base stations comprises the wireless relays scanning for the wireless base stations and generating scanning results; and the wireless relays transferring the configuration data indicating their media services comprises the wireless relays transferring the configuration data indicating the scanning data and their media services.

9. The method of claim 1 wherein the individual QoS levels comprise Long Term Evolution (LTE) Carrier Aggregation (CA) QoS levels.

10. A wireless data network to control Quality-of-Service (QoS) delivered to wireless relays comprising:

the wireless relays configured to attach to wireless base stations in the wireless data network and transfer configuration data indicating their media services to the wireless data network;

a relay QoS control system in the wireless data network configured to receive the configuration data, allocate individual QoS levels to the wireless relays based on their media services, and transfer the individual relay QoS levels for the wireless relays to the wireless base stations;

the wireless relays configured to exchange user data with wireless user devices to deliver the media services; and some of the wireless base stations configured to direct some of the wireless relays to re-attach to other ones of the wireless base stations based on the individual QoS levels for the wireless relays.

11. The wireless data network of claim 10 wherein the relay QoS server is configured to allocate higher ones of the individual QoS levels to ones of the wireless relays that deliver a voice media service and to allocate lower ones of the individual QoS levels to other ones of the wireless relays that do not deliver the voice media service.

12. The wireless data network of claim 10 wherein the relay QoS server is configured to allocate higher ones of the individual QoS levels to ones of the wireless relays that deliver a specific type of voice media service and to allocate lower ones of the individual QoS levels to other ones of the wireless relays that do not deliver the specific type of voice media service.

13. The wireless data network of claim 10 wherein the relay QoS server is configured to allocate higher ones of the individual QoS levels to ones of the wireless relays that deliver a Code Division Multiple Access (CDMA) media service and to allocate lower ones of the individual QoS levels to other ones of the wireless relays that do not deliver the CDMA media service.

14. The wireless data network of claim 10 wherein the relay QoS server is configured to allocate higher ones of the individual QoS levels to ones of the wireless relays that deliver a video media service and to allocate lower ones of the individual QoS levels to other ones of the wireless relays that do not deliver the video media service.

15. The wireless data network of claim 10 wherein the relay QoS server is configured to allocate determine a set of the wireless relays that are attached to one of the wireless base stations and to transfer the individual relay QoS levels for the set of the wireless relays to the one of the wireless base stations.

16. The wireless data network of claim 10 wherein the wireless access points in the wireless relays are configured to determine their media services and indicating their media services to Relay Equipment (REs) in the wireless relays and the REs are configured to transfer the configuration data indicating the media services delivered by their wireless access points to the wireless data network.

17. The wireless data network of claim 10 wherein the wireless relays are configured to scan for the wireless base stations to generate scanning results and to transfer the configuration data indicating the scanning data and their media services.

18. The wireless data network of claim 10 wherein the individual QoS levels comprise Long Term Evolution (LTE) Carrier Aggregation (CA) QoS levels.

\* \* \* \* \*